Nov. 24, 1959 S. H. ROTH 2,914,732
PHASE LOCK SYSTEM
Filed May 28, 1958
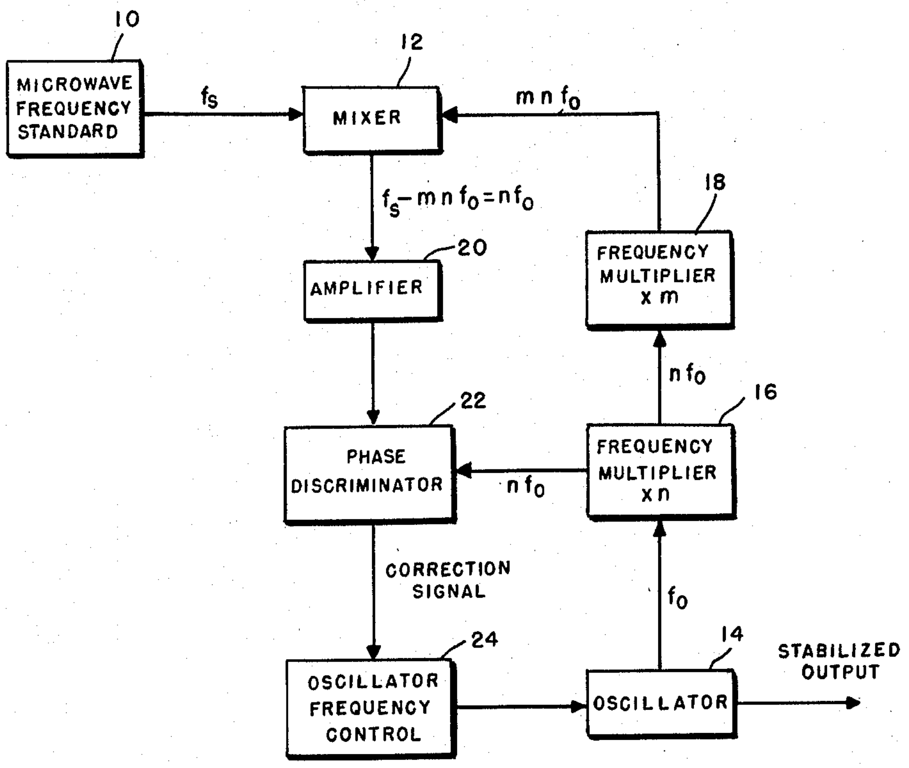
*INVENTOR,*
SEYMOUR H. ROTH
*BY* Harry M. Saragovitz
ATTORNEY.

United States Patent Office 2,914,732

Patented Nov. 24, 1959

2,914,732

PHASE LOCK SYSTEM

Seymour H. Roth, Elberon, N.J., assignor to the United States of America as represented by the Secretary of the Army Application May 28, 1958, Serial No. 738,575

1 Claim. (Cl. 331—18)

(Granted under Title 35, U.S. Code (1952), sec. 266)

The invention described herein may be manufactured and used by or for the Government for governmental purposes, without the payment of any royalty thereon.

This invention relates to frequency control systems and particularly to means for locking the frequency of a low frequency oscillator to that of a high frequency precision oscillator such as a maser.

With the advent of frequency standards much higher in frequency than oscillators which it would be desirable to control by such standards, there is a need for an improved inter-oscillator phase-lock system suitable for step down (in frequency) locking in order to take advantage of these new standards. It is the object of this invention to provide such an improved phase-lock system.

In accordance with the invention, means are provided to first mix a multiple of a low frequency oscillator frequency with the output of a high frequency standard operating at an appropriate frequency to obtain a difference frequency which is a lower multiple of the low frequency oscillator than the first named multiple when the low frequency oscillator is operating at the frequency to be stabilized. This intermediate frequency is fed to a phase detector together with a second frequency having the same multiple relation to the low frequency oscillator. This second frequency is obtained from a multiplier driven by the low frequency oscillator. The output of the phase detector is an error voltage which is applied to an oscillator frequency control circuit to keep the low frequency oscillator locked to the high frequency oscillator. A conventional voltage sensitive frequency control circuit may be employed.

For a better understanding of the invention, together with other objects thereof, reference is made to the following description and accompanying drawing in which there is shown a block diagram of an embodiment of the invention.

Referring now to the drawing, the output $f_s$ from microwave frequency standard 10, such as a maser, is fed to a mixer 12 together with a multiple of the low frequency oscillator which is equal to *mn* times the desired stabilized output frequency $f_0$ of a low frequency oscillator 14. This multiple is obtained by means of a first frequency multiplier 16, which multiplies the frequency of oscillator 14 by $n$ to obtain $nf_0$, and a frequency multiplier 18 which multiplies the output of multiplier 16 by $m$. The product of $m$ times $n$ is chosen to produce a multiple frequency $mnf_0$, which differs from the microwave frequency $f_s$ by an intermediate frequency $nf_0$.

The difference frequency output of mixer 12, which is $f_s-mnf_0$, is amplified by amplifier 20 and fed to one input of a phase difference detector or discriminator 22. The output $nf_0$ of frequency multiplier 16 is also fed to phase discriminator 22 where it is compared with the quantity $f_s-mnf_0$. Frequencies $f_s$ and $f_0$ are so chosen that when phase lock occurs $f_s-mnf_0$ equals $nf_0$. The output of phase discriminator 22 provides an error signal which is fed to oscillator frequency control circuit 24 which in turn effects any necessary correction of the frequency of oscillator 14 until there is a phase lock between the two signals applied to the discriminator.

To examine the generation of the error voltage, note first that any variation $\Delta\theta$ in $f_0$ will result in one input to the discriminator changing by $n\ \Delta\theta$ and the other input changing by $mn\ \Delta\theta$. With a discriminator output which is proportional to the cosine of the phase difference, and the discriminator operated normally (at phase-lock) with a 90° phase difference between inputs, the discriminator output will be proportional to cos $$[90°+(mn-n)\Delta\theta]$$

The output will, of course, be positive or negative depending upon whether $\Delta\theta$ is positive or negative.

Excellent locking characteristics may be obtained by means of the invention even though the high frequency standard is operated in the kilomegacycle range and the low frequency oscillator in the kilocycle range. Quite effective phase discrimination may be obtained with the discriminator operating in the megacycle range or below.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

A phase-lock system for locking the frequency $f_0$ of a low frequency oscillator to the frequency $f_s$ of a high frequency standard maser oscillator comprising a first frequency multiplier responsive to said low frequency oscillator for producing a multiple frequency $nf_0$, a second frequency multiplier responsive to the output of said first frequency multiplier for producing a multiple frequency of said output $mnf_0$, means responsive to said second multiplier output $mnf_0$ and high frequency oscillator output $f_s$ for producing difference frequency $f_s-mnf_0$, phase discriminating means responsive to said first multiplier output $nf_0$ and said difference frequency $f_s-mnf_0$ for producing an error voltage whenever said difference frequency and $nf_0$ differ in phase from a predetermined phase relation, means responsive to said error voltage for adjusting the frequency of said low frequency oscillator to shift the phase of said first multiplier output $nf_0$ toward said predetermined phase relation with said difference frequency.

References Cited in the file of this patent

UNITED STATES PATENTS 2,505,043 Guanella ............ Apr. 25, 1950